(12) United States Patent
Yokota et al.

(10) Patent No.: US 7,027,151 B2
(45) Date of Patent: Apr. 11, 2006

(54) SPECTROPHOTOMETER

(75) Inventors: Kazumi Yokota, Osaka-fu (JP); Tomoki Sasayama, Nagaokakyo (JP)

(73) Assignee: Shimadzu Corporation, Kyoto (JP)

( * ) Notice: Subject to any disclaimer, the term of this patent is extended or adjusted under 35 U.S.C. 154(b) by 367 days.

(21) Appl. No.: 10/703,665

(22) Filed: Nov. 10, 2003

(65) Prior Publication Data

US 2004/0090624 A1  May 13, 2004

(30) Foreign Application Priority Data

Nov. 11, 2002  (JP) ............................. 2002-326284

(51) Int. Cl.
*G01J 3/02* (2006.01)
*G01J 3/18* (2006.01)
*G01J 3/42* (2006.01)

(52) U.S. Cl. ....................... 356/319; 356/328; 356/334

(58) Field of Classification Search ................ 356/319, 356/326, 328, 332, 334
See application file for complete search history.

(56) References Cited

U.S. PATENT DOCUMENTS 5,096,295 A * 3/1992 Krupa et al. ................. 356/334

FOREIGN PATENT DOCUMENTS

JP         1-221627     *  9/1989

* cited by examiner

*Primary Examiner*—F. L. Evans
(74) *Attorney, Agent, or Firm*—Manabu Kanesaka

(57) ABSTRACT

In a spectrophotometer, the following formula is stored in advance as a correction formula of a rotation angle in a correction formula storing portion; $\theta'=\theta+A\cdot\sin(C1\cdot\theta+\theta a)+B\cdot\sin(C2\cdot\theta+\theta b)+\theta c$, wherein $C1$, $C2$ represent coefficients theoretically determined in advance by a structure of a reduction mechanism, and $A$, $B$, $\theta a$, $\theta b$, $\theta c$ are coefficients specific to the reduction device which are calculated based on measurement results of a plurality of bright line spectrums through fittings by a coefficient determining portion. In case a sample is measured actually, when a desired wavelength is set, a rotation angle correcting portion corrects a rotation angle $\theta$ corresponding to the desired wavelength to calculate $\theta'$ by applying the above-stated correction formula, and then, controls a motor so that a diffraction grid is rotated by the angle $\theta'$.

4 Claims, 4 Drawing Sheets a case where the respective bright line measuring points are gathered in one cycle of the error curve.

a case where 10 bright line measuring points are dispersed in 6 cycles of the error curve

SPECTROPHOTOMETER

BACKGROUND OF THE INVENTION AND RELATED ART STATEMENT

The invention relates to a spectrophotometer, more particularly, a spectroscope for taking out a monochromatic light having a specific wavelength in a spectrophotometer.

In a spectrophotometer, such as an ultraviolet visible light spectrophotometer and an atomic absorption spectrophotometer, a spectroscope (monochromator) has been used to obtain monochromatic light having a predetermined wavelength. The spectroscope has a structure generally including a diffraction grid (wavelength dispersion element) and a driving mechanism for changing an angle of the wavelength dispersion element with respect to an incident ray. The diffraction grid is suitably rotated by the driving mechanism to thereby take out monochromatic light of the desired wavelength through an exit slit, the position of which is fixed. Therefore, the precise wavelength of the monochromatic light is greatly dependent on the precise angle of the diffraction grid. Therefore, the driving mechanism for precisely rotating the diffraction grid with a micro-pitch is required in order to increase the wavelength precision.

Heretofore, generally, there has been known a driving mechanism using a sine bar mechanism. Also, there has been proposed a driving mechanism using a Harmonic Drive (registered trade mark) mechanism, which is a kind of reduction gear. While the Harmonic Drive mechanism is a good reduction device for obtaining a large reduction ratio, it is inevitable to generate a cyclic error from the characteristics of the structure. The cyclic error directly lowers the precision of the wavelength of the spectrophotometer.

Therefore, the applicant of the invention has proposed a method for correcting the error as disclosed in Japanese patent publication (KOKAI) No. 1-221627 (page 3, column on upper right, line 10—the same page, column on lower right, line 2). In the correction method proposed by the publication, the error shape due to the Harmonic Drive mechanism is measured in advance, and a formula approximate to the error shape is formed in advance. Then, the wavelengths of a plurality of the bright line spectrums are actually measured, and a parameter, the wavelength deviation of which becomes smallest, is determined by changing combination of the parameters contained in the approximate formula. With this correction, the cyclic error of the Harmonic Drive mechanism is considerably solved.

In case such a correction is carried out, as the number of the bright line spectrums, i.e. the number of the referring wavelengths, is increased, the precision of the approximate formula becomes higher. However, actually, since the number of the bright line spectrums is considerably limited, it is difficult to increase the precision of the approximate formula. Also, as disclosed in the publication, in case the cyclic error of the Harmonic Drive mechanism is measured in detail by using an accurate encoder or the like at the beginning and the approximate formula is formed based on the measured results, the adjusting work or the like on the manufacturing process becomes very complicated and takes large troubles, which may result in an increased cost.

In view of the above problems, the present invention has been made and an object of the invention is to provide a spectrophotometer employing the Harmonic Drive mechanism as a reduction mechanism for a spectroscope, wherein while suppressing increase in costs for manufacturing, assembling and adjusting works, the cyclic error of the Harmonic Drive mechanism is sufficiently corrected to thereby carry out an analysis at a high wavelength precision.

Further objects and advantages of the invention will be apparent from the following description of the invention.

SUMMARY OF THE INVENTION

A spectrophotometer with a spectroscope includes a motor, a reduction device formed of a Harmonic Drive mechanism to reduce rotation of the motor and a wavelength dispersion element driven by the reduced rotation of the reduction device, to solve the above problems. The spectrophotometer includes a correction formula storing device for storing an approximate correction formula expressing a cyclic error waveform of the reduction device by a linear binding of functions having a periodicity of 1/n (n represents a natural number dependent on a structure of the reduction device) of a cycle corresponding to one cycle on an input axis side of the reduction device; a coefficient acquiring device calculating and storing one or more coefficients contained in the correction formula based on measured results of bright line spectrums; and a control device for correcting a rotating angle corresponding to an objective wavelength by applying the correcting formula using the coefficients when the objective wavelength is set in an actual measurement, and controlling the motor to obtain the corrected rotating angle.

A Harmonic Drive mechanism generally has a structure such that only vicinities of two points along a long axis of a gear elliptically elastically deformed, which is called a flex sprain, are engaged with teeth of a component in an internal gear, which is called a circular sprain. Therefore, a cyclic error of the Harmonic Drive mechanism has a waveform including two heaps, i.e. positive peaks, of different heights in a cycle. A parameter relating to its cycle is considered to be a value depending on a structure of a reduction ratio and the like. In this case, a cyclic error waveform of the Harmonic Drive mechanism is considered to be a function having a cycle corresponding to one rotation of an input axis, which can be expressed by a linear binding or connection of functions having one half periodicity of the cycle. Specifically, for example, a correction formula is constituted such that a waveform of one cycle of the cyclic error depending on the structure of the Harmonic Drive mechanism is expressed by one or more cyclic functions, for example, a linear binding of a sine function or a cosine function.

In other words, for example, the following correction formula can be set with respect to a rotation angle θ which is an output of the Harmonic Drive mechanism:

$$\theta' = \theta + A \cdot \sin(C1 \cdot \theta + \theta a) + B \cdot \sin(C2 \cdot \theta + \theta b) + \theta c$$

wherein C1, C2 represent coefficients theoretically determined by the structure of the Harmonic Drive mechanism; A, B, θa, θb, θc represent coefficients based on the measurement results of bright line spectrum, i.e. coefficients which are experimentally determined.

In a spectrophotometer according to the present invention, data expressing the above-described correction formula is stored in advance in a correction formula storing device. For example, when an adjusting work in the manufacturing process of the device, a repair work, maintenance work or the like is carried out, a predetermined bright line spectrum is measured, and a coefficient obtaining device calculates one or more coefficients contained in the correction formula based on the measured results to store therein. At this time, measurement points of the bright line spectrums discretely obtained are taken in one cycle of the cyclic error by folding or incorporating together, and by finding out coefficients most suitably close to the waveform in one cycle, so that good proximity can be obtained even if the number of the bright line spectrums is relatively small.

In case a sample is actually measured, when an objective wavelength to be taken out from the spectroscope is set, the control device calculates the angle θ' by correcting the rotation angle θ corresponding to the objective wavelength by applying the correction formula completed by taking in the coefficients. Then, a motor is controlled to rotate the wavelength dispersion element, i.e. typically, diffraction grid, by the angle θ'.

DETAILED DESCRIPTION OF THE INVENTION

Figure 1:
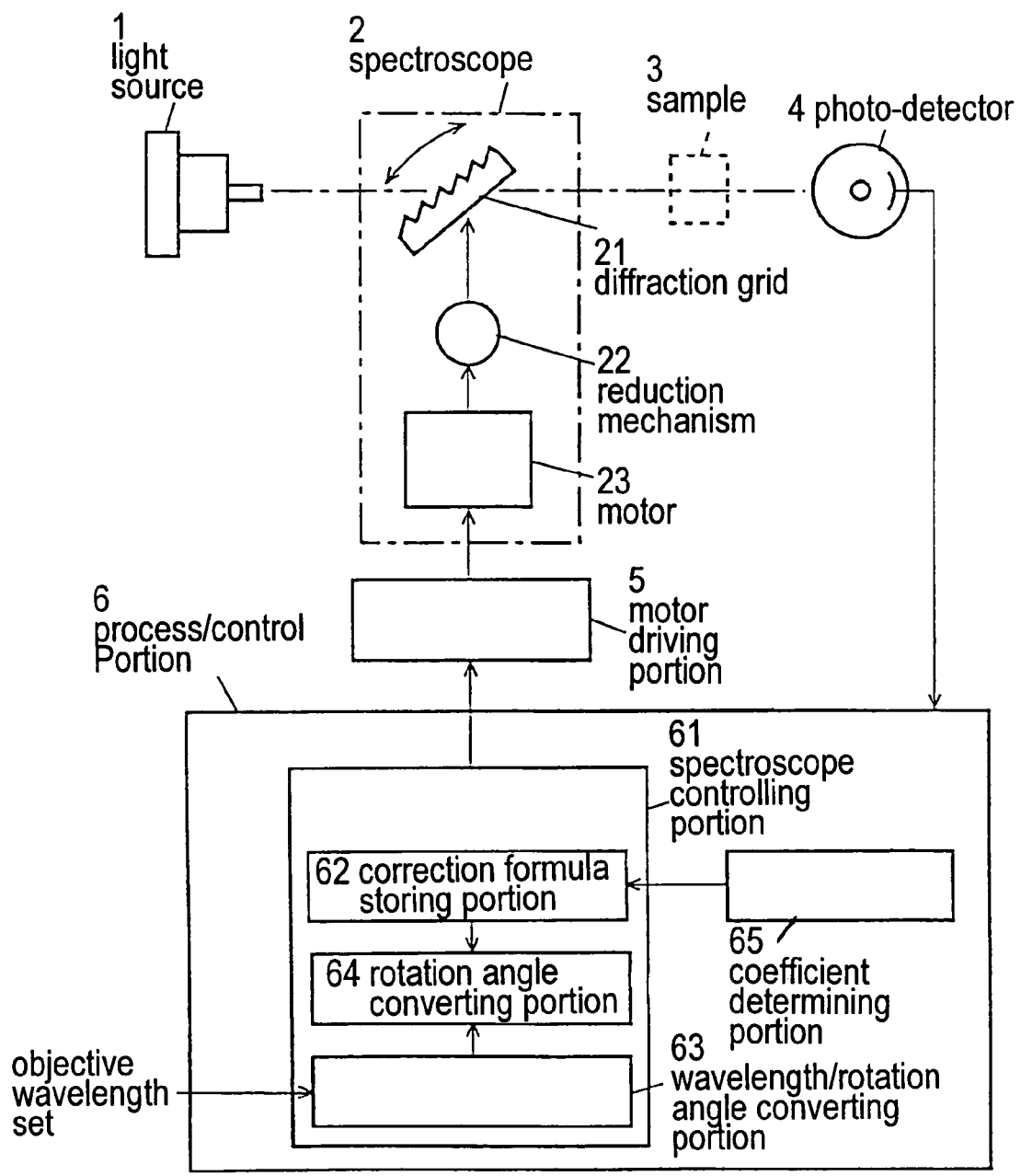
FIG. 1 is a block diagram showing essential parts of a spectrophotometer of an embodiment according to the invention.

Hereunder, a spectrophotometer of an embodiment according to the present invention will be explained with reference to the accompanying drawings. FIG. 1 is a block diagram showing essential portions of the spectrophotometer of the embodiment.

In FIG. 1, a light radiated from a light source 1 includes a broad range or a plurality of wavelengths. One of the wavelengths is selected at a spectroscope 2 to be taken out as a homogeneous light therefrom. The spectroscope 2 includes a diffraction grid 21 rotating in a predetermined angle area, a motor, i.e. pulse motor, 23 as a driving source, and a reduction mechanism 22 for driving the diffraction grid 21 by reduction rotation of a motor shaft at a predetermined reduction ratio, by a Harmonic Drive gear or mechanism. The monochromatic light taken out of the spectroscope 2 is radiated to a sample 3, the light reflected from the sample 3 or the light transmitted through the sample 3 is introduced into a photo-detector 4, and a detected signal corresponding to the optical power is outputted. The detected signal is inputted into a process/control portion 6 where a predetermined operating process is carried out to calculate an absorbance and a reflection coefficient.

The process/control portion 6 includes a spectroscope controlling portion 61 in addition to the operation processing function of the signal as described above. The spectroscope controlling portion 61 carries out a predetermined process as described later based on a given objective wavelength, and controls the motor 23 through a motor driving portion 5 based on the result thereof. In order to carry out the processes, the spectroscope controlling portion 61 includes a correction formula storing portion 62, a wavelength/rotation angle converting portion 63, and a rotation angle correcting portion 64 as functions. Also, there is provided a coefficient determining portion 65 for calculating a plurality of coefficients in the correction formula stored in the correction formula storing portion 62.

Next, there will be explained a theory such that, in the spectrophotometer having the structure as described above, a transmission error in the driving mechanism of the diffraction grid 21, which is a wavelength dispersion element, is corrected, and then, a wavelength error resulting from the error is dissolved.

A theoretical formula for converting a wavelength value of the monochromatic light taken out of the spectroscope 2 into a rotation angle θ on the output side of the motor 23, is expressed as follows:

$$\theta = \sin^{-1}[m\lambda/(2d \cdot \cos K)] \quad (1)$$

wherein m represents an order of the diffraction light to be used, d represents a space (nm) between the grid grooves of the diffraction grid, and K represents one half (rad) of a deviation angle (an angle formed by an entering light and an outgoing light of the diffraction grid) of the spectroscope. The spectroscope controlling portion 61, as a basic operation, finds a rotation angle θ of the motor 23 based on the above-stated formula (1) when it receives a command relating to the objective wavelength λ to be set in the diffraction grid 21. Further, the spectroscope controlling portion 61 converts the rotation angle θ0 to a pulse number for controlling the motor, and sends out the pulse number to the motor 23.

A converse relation of the formula (1) is:

$$\lambda = (2d \cdot \cos K/m) \cdot \sin \theta \quad (2)$$

In case d and K are different due to errors or the like at the time of manufacturing and assembling, the wavelength of the monochromatic light taken out is temporarily changed by the change of (2d·cos K/m). In considering an offset quantity of the rotating angle of the motor 23, the spectroscope controlling portion 61 provides a linear transformation by the following formula (3) with respect to the objective wavelength λ.

$$\lambda' = a \cdot \lambda + b \quad (3)$$

Hereinafter, instead of λ, when a conversion, i.e. λ→θ, is carried out by using formula (1) with λ', the incorrectness of the wavelength resulting from the d, K errors can be removed. Incidentally, the correction coefficients a, b in formula (3) can be determined based on a linear regression from the measured results of the bright line spectrum, the wavelength of which is known.

However, at this stage, the incorrectness accompanying the cyclic error inherent to the Harmonic Drive mechanism or gear still remains. Therefore, in the spectrophotometer according to the present embodiment, a correction formula for correcting the cyclic error of the Harmonic Drive mechanism is separately employed. A model of the correction formula can be obtained as follows.

Figure 2:
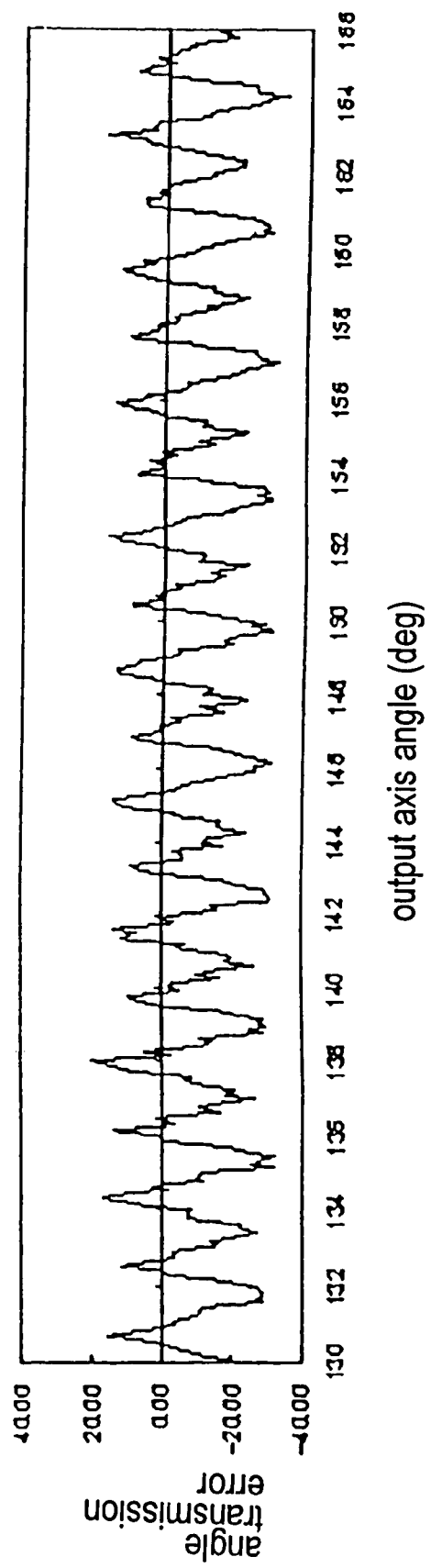
FIG. 2 is a graph showing an actually measured example of cyclic errors of the Harmonic Drive gear.

FIG. 2 is an example showing actual measurement results of the cyclic errors of the Harmonic Drive gear. In FIG. 2, the abscissa represents an actual rotating angle of the gear output shaft, and the ordinate represents difference between an actual rotation angle and an ideal (i.e. in case there is no error) rotation angle. This is a measuring example of a gear with a reduction ratio of 1/100, which is considered to be a cyclic function of one cycle by one rotation of an input axis, i.e. 1/100 rotation (=3.6 deg) of an output axis, so that two heaps having different heights are included in one cycle. This phenomenon can be sufficiently explained in the light of the theory of the Harmonic Drive gear as mentioned above.

From FIG. 2, it is considered that the cyclic error is present even if the gear is rotated in any rotating state. Therefore, it is possible to express the cyclic error by the linear binding of the functions each having one half periodicity of one cycle corresponding to one rotation of the input axis of the Harmonic Drive gear. Here, a sine function is used as the cyclic function. In other words, the following formula (4) can be set as a correction formula for correcting the cyclic error with respect to the rotating angle θ obtained by formula (1).

$$\theta' = A \cdot \sin(C1\theta + \theta a) + B \cdot \sin(C2\theta + \theta b) + \theta c \quad (4)$$

wherein C1, C2 are coefficients determined from the reduction ratio of the reduction mechanism 22; A, B, θa, θb, θc are coefficients specific to a device differing in every reduction mechanism (i.e. every spectroscope or every spectrophotometer). The second item, third item and fourth item on the right side of formula (4) express the cyclic error components of the gear; and C1, C2 are parameters relating to the cycle, for example, in case of the Harmonic Drive gear with the reduction ratio of 1/100, the values of C1 and C2 are 200 and 100, respectively.

Since C1 and C2 in formula (4) are coefficients not depending on the individual difference only when the kind of the gear is determined, the portions except for the specific numeral values of the coefficients A, B, θa, θb, θc in formula (4) are stored in the storing portion 62 as the correction formula. On the other hand, it is required to find coefficients A, B, θa, θb, θc in formula (4) for every spectrophotometer.

Therefore, next, a group of the coefficients of the correction formula is obtained based on the results of the bright line spectrums measured to determine the correcting coefficients a, b in formula (3). Specifically, the coefficients can be determined by using a fitting method, such as a non-linear minimum square method, based on the measured results of the bright line spectrums. Generally, measurable bright line spectrums are discrete and limited in the number, so that only several bright line spectrum measuring points exist in a period of several cycles to several tens of cycles of the cyclic error curve. Therefore, in the present embodiment, the measuring points of the bright line spectrums are gathered in one cycle of the error curve by folding or incorporating the same, and the fitting process is applied only to the one cycle, so that a stable regression result can be obtained.

For example, the folding process is carried out as follows. In case a gear of a reduction ratio of 1/n is used, a corresponding-phase cyclic error curve is obtained for every output axis of 360/n (deg). Therefore, with respect to a graph plotting the grid rotating angles where the respective bright line spectrum measuring positions which are measured are shown in the abscissa, and the displacements from the grid rotation angles converted from the true values of the bright line spectrums, which is expressed in the ordinate, when the horizontal shaft direction is moved to a surplus position obtained by dividing with 360/n (deg), the plotted points of the bright line spectrums all fall in one cycle of the error curve.

Figure 3B:
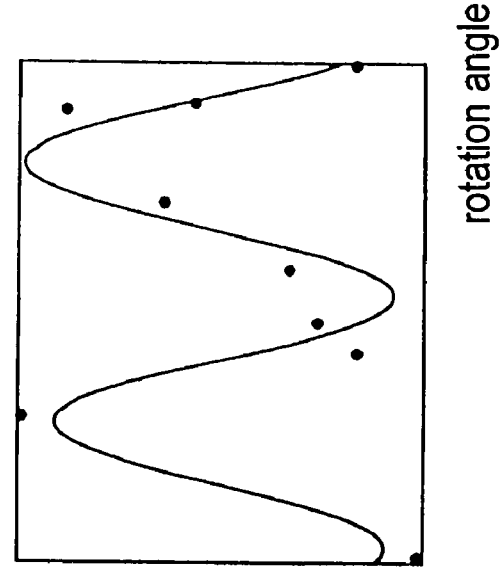
FIGS. 3(a) and 3(b) show an example converted from ten measuring points dispersed in 6 cycles of error curves to ten measuring points dispersed in one cycle of an error curve.
Figure 3A:
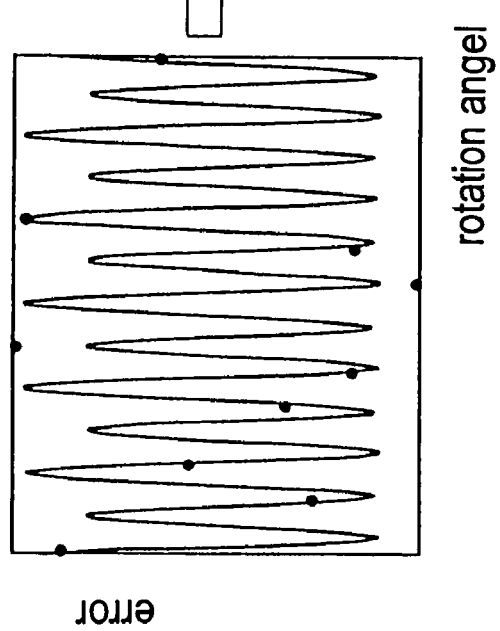
Figure 4:
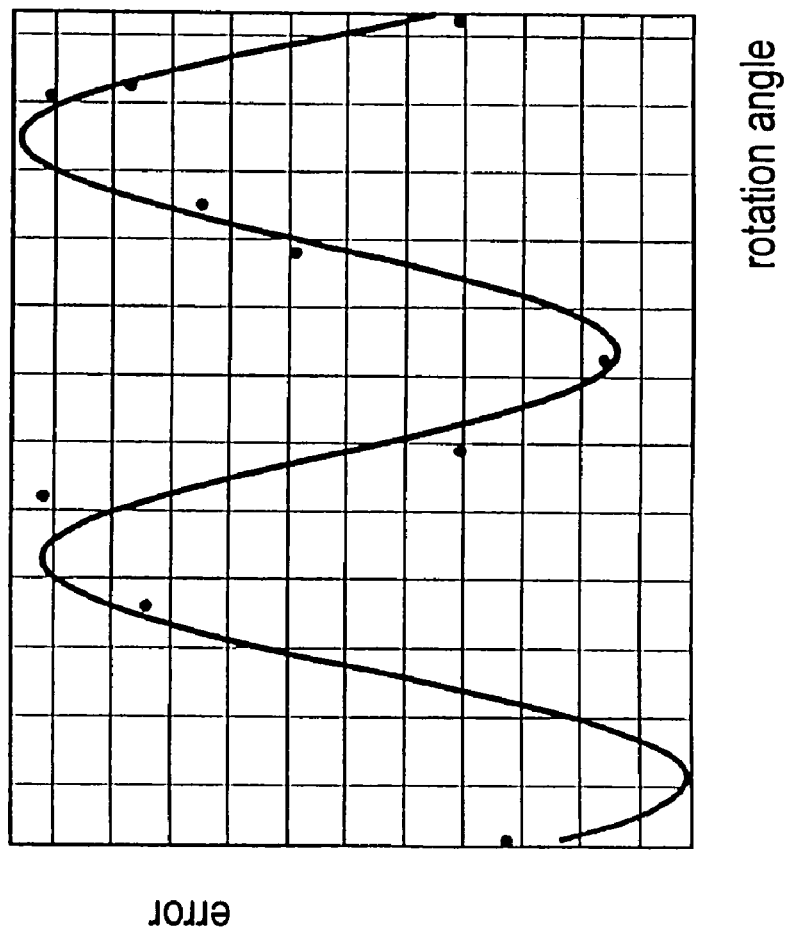
FIG. 4 is a graph showing an example of results of fitting error curve based on bright line spectrums.

A specific example thereof is shown in FIG. 3. The example shows a case where 10 bright line measuring points dispersed in 6 cycles of the error curve are folded or gathered in one cycle. As described above, when an error waveform shape of the one cycle is found by using the plural measuring points gathered in the one cycle, the waveform with higher precision, i.e. the above-stated coefficients with higher precision, can be obtained. The fitting results of the error curve thus obtained are shown in FIG. 4. In FIG. 4, the abscissa represents rotation angles, and the ordinate represents displacements from ideal values. As can be seen from FIG. 4, a curve formed of two kinds of heaps and valleys is fitted. The coefficients obtained as described above are reflected to formula (4) to thereby complete a correction formula.

Next, in the spectrophotometer having the structure as shown in FIG. 1, the correction process of the cyclic error as described above will be explained. First, a correction model formula, where only C1, C2 of formula (4) are determined, is stored in the correction formula storing portion 62. For example, in case a person in charge gives a predetermined command in an adjusting process or an adjusting work after the maintenance or repair of the device, the process/control portion 6 automatically carries out the adjustment. In other words, a light source 1 including a plurality of bright line spectrums is lighted, and measurements relating to the respective bright lines are experimentally carried out. The coefficient determining portion 65 finds the coefficients A, B, θa, θb, θc in the correction formula by using the measured results as described above. The coefficients are added to the correction formula storing portion 62 to be stored. Incidentally, since the correction model formula is not rewritten afterward, the data constituting the structure may be stored in an unchangeable memory. However, since there is a possibility of rewriting the coefficients A, B, θa, θb, θc, it is necessary to use a rewritable memory.

In case an actual measurement is carried out in using the spectrophotometer, when an objective wavelength is set by the process/control portion 6, the wavelength/rotation angle converting portion 63 carries out conversion to the rotation angle θ based on formula (1) after it carries out correction based on formula (3) with respect to the objective wavelength. Thereafter, the rotation angle correcting portion 64 reads out the correction formula stored in the correction formula storing portion 62 and corrects the rotation angle θ based on formula (4) to obtain the rotation angle θ'.

A conversion table showing the matching relationship between the pulse number to be given to the motor 23 and rotation angle is prepared in the spectroscope controlling portion 61 in advance. The pulse number is calculated from the rotation angle θ' with reference to the table. Then, the pulse signals of the calculated pulse number are sent to the motor 23 through the motor driving portion 5. Thus, the motor 23 is rotated, and the diffraction grid 21 is rotated through the reduction mechanism 22. As described above, the diffraction grid 21 is accurately set at an angle so that the monochromatic light having the objective wavelength is taken out.

With respect to the cyclic error of the reduction mechanism 22, it is considered that the affect by the change with age, i.e. abrasion and the like, of the structural components is negligible. Therefore, the repeatability of the cyclic error is high until the Harmonic Drive gear or the like is exchanged, so that once prepared correction formula can be continuously used. In other words, for example, once the coefficients of the correction formula are found and stored by using the results of the experimental measurements with respect to the plural bright line spectrums in the assembling and adjusting process of the spectrophotometer in the manufacturing facility, a user who bought the spectrophotometer is not required to carry out such adjustment. It is necessary to find the coefficients again when the gear or the like is exchanged. However, normally, since the user asks a maintenance staff of the maker to get someone to repair the spectrophotometer, the user need not repair.

According to the spectrophotometer of the invention, since the cyclic error inherent to the Harmonic Drive mechanism can be reduced, the precision of the wavelength can be improved to thereby increase accuracy of the spectroscopy measurement. Also, when the correction formula is prepared, it is not required to measure the shape of the actual cyclic error of the Harmonic Drive mechanism in detail. Moreover, when the coefficients to be contained in the correction formula are calculated, an operation process after completion of the measurement of a series of bright line spectrums can be automatically carried out. Therefore, it does not take much labor and time to determine the correction formula containing the coefficients, so that the determination of the correction formula can be completed in a short time.

While the invention has been explained with reference to the specific embodiments of the invention, the explanation is illustrative and the invention is limited only by the appended claims.

What is claimed is:

1. A spectrophotometer comprising:
   a spectroscope including a motor, a reduction device formed of a Harmonic Drive mechanism and connected to the motor to reduce rotation of the motor, and a wavelength dispersion element driven by the reduction device,
   a correction formula storing device for storing a correction formula expressing a cyclic error waveform of the reduction device, said correction formula including a linear binding of functions having a periodicity of 1/n of a cycle corresponding to one cycle on an input axis side of the reduction device, where n represents a natural number dependent on a structure of the reduction device,
   a coefficient acquiring device for calculating and storing at least one coefficient contained in the correction formula based on measured results of bright line spectrums, and
   a control device electrically connected to the reduction device, correction formula storing device and coefficient acquiring device for correcting a rotating angle corresponding to an objective wavelength in using the correction formula with the coefficients when the objective wavelength is set in an actual measurement and controlling the motor to obtain the corrected rotating angle.

2. A spectrophotometer as claimed in claim 1, wherein said correction formula shows a waveform of one cycle of a cyclic error dependent on a structure of the reduction device expressed by a linear binding of cyclic functions.

3. A spectrophotometer as claimed in claim 2, wherein said correction formula is expressed by $$\theta' = \theta + A \cdot \sin(C1 \cdot \theta + \theta a) + B \cdot \sin(C2 \cdot \theta + \theta b) + \theta c$$

wherein C1, C2 are coefficients determined from reduction ratio of the reduction mechanism, and A, B, $\theta a$, $\theta b$, $\theta c$ are coefficients specific to the reduction device.

4. A spectrophotometer as claimed in claim 3, wherein said control device includes the correction formula storing device, the coefficient acquiring device, a rotation angle correcting portion, and a wavelength/rotation angle converting portion.

* * * * *